United States Patent [19]
Schenk et al.

[11] 3,872,165
[45] Mar. 18, 1975

[54] MANUFACTURE OF VINYL SULFONATES AND VINYLSULFONIC ACID FROM CARBYL SULFATE

[75] Inventors: Walter Schenk, Bad Duerkheim; Roland Dahlinger, Neckargemuend; Dieter Stockburger, Gruenstadt, all of Germany

[73] Assignee: Badische Anilin- & Soda-Fabrik Aktiengesellschaft, Ludwigshafen Rhine, Germany

[22] Filed: Nov. 30, 1971

[21] Appl. No.: 203,453

[30] Foreign Application Priority Data
Nov. 30, 1970 Germany............................ 2058776

[52] U.S. Cl............................................. 260/513 R
[51] Int. Cl............................................. C07c 143/16

[58] Field of Search .............................. 260/513 R

[56] References Cited
UNITED STATES PATENTS
3,255,240   6/1966   Wolfram et al................. 260/513 R OTHER PUBLICATIONS
Breslow et al., V. Am. Chem. Soc. 79, 5000–5002 (1957).

*Primary Examiner*—Leon Zitver
*Assistant Examiner*—Nicky Chan
*Attorney, Agent, or Firm*—Johnston, Keil, Thompson & Shurtleff

[57] ABSTRACT

Manufacture of vinyl sulfonates and vinylsulfonic acid by saponifying carbyl sulfate under alkaline conditions.

3 Claims, No Drawings

MANUFACTURE OF VINYL SULFONATES AND VINYLSULFONIC ACID FROM CARBYL SULFATE

This invention relates to a process for the manufacture of vinyl sulfonates and vinylsulfonic acid by the saponification of carbyl sulfate under alkaline conditions.

It is known to prepare vinyl sulfonates from β-haloethane sulfonates by treatment with alkalis or by alkaline hydrolysis of β-chloroethanesulfonic chloride; the ammonium salt of vinylsulfonic acid can also be prepared by the hydrolysis of 1,2-ethanedisulfonic chloride. Another possible route is via the hydrolysis of the dichloride of ethanedisulfonic acid-1,2 with water or alcohol or with sodium acetate in glacial acetic acid.

The vinyl sulfonates produced by these processes are obtainable, however, only in a strongly discolored form and are very impure due to side reactions. Thus it is necessary to effect expensive and time-consuming recrystallizations, which are associated with considerable losses of material, if it is desired to obtain polymerizable compounds. The salts manufactured in this manner have only a limited number of commercial applications due to the fact that the starting materials are not readily available and because of the high price of the products. Furthermore, a drawback common to all of the previously proposed methods of manufacture is that considerable quantities of common salt and other salts are produced in alkaline hydrolysis and the quantitative separation of such salts is very troublesome and very expensive. Moreover, the remaining traces of anions, particularly chloride ions, are detrimental to polymerization in many cases or are responsible for corrosion of the apparatus.

It is known from Regnault, Ann., Band 25, p. 32 (1838) and Magnus, Ann., Band 31, p. 249 (1839) that carbyl sulfate may be prepared from ethylene or absolute alcohol and sulfur trioxide and that carbyl sulfate may be saponified with water to form isethionic acid or can be converted to vinyl sulfonates by alkaline saponification. The alkaline hydrolysis of carbyl sulfate to vinylsulfonates as described in the above citation is, indeed, possible in principle under laboratory conditions with the gradual addition of very small amounts of carbyl sulfate. However, under large-scale conditions the use of this method involves insurmountable difficulties due to the large amount of heat of reaction of more than 400 kcal/kg. Even if the carbyl sulfate is treated in a strongly alkaline medium, for example caustic soda, summation of the heats of reaction causes this to be heated at the interface to such an extent that the main product is isethionate together with a little vinyl sulfonate, this being due to the base-catalyzed addition of water at the double bond. Once its sultone ring has been opened, carbyl sulfate is not resistant to aqueous alkali when the temperature is above 40°C. If, to counteract this, the reaction is carried out at room temperature or even lower temperatures, the reaction rate falls to such an extent that the reaction assumes a "frozen" condition which is interrupted by occasional explosive bursts of reaction, polysulfonates and isethionate being formed. It is well known that the formation of these undesirable by-products increases in an acid medium, so that it has not hitherto been possible to operate under acid conditions.

It is an object of the invention to provide a method of preparing vinyl sulfonates in which the vinyl sulfonates is obtained in a substantially pure form without the formation of a plurality of by-products.

This object is achieved in a process for the manufacture of vinyl sulfonates and vinylsulfonic acid by treating carbyl sulfate under alkaline conditions optionally followed by liberation of vinysulfonic acid by treatment of the resulting vinyl sulfonates with acids, in which process the vinyl sulfonates are prepared in two stages, in the first of which there is added to an aqueous basic solution or suspension an amount of carbyl sulfate which is equivalent to the hydroxyl ion portion of the solution, said addition being at such a rate that the pH of the mixture during the addition remains between 9 and 12 and the temperature remains between 30° and 50°C, and in the second stage the reaction solution is heated to from 70° to 150°C.

The starting material for the process of the invention is carbyl sulfate prepared in known manner from ethylene or ethanol and sulfur trioxide. It is advantageous to purify the carbyl sulfate so that it contains no more free sulfur trioxide.

The basic solutions are conveniently based on an alkali or alkaline earth metal hydroxide solution or suspension. The process of the invention is preferably carried out using an alkali metal hydroxide solution, in particular a sodium hydroxide solution, or an alkaline earth metal hydroxide solution or suspension, in particular a calcium hydroxide solution or suspension.

The basic solutions are conveniently used as 3M to 10M aqueous solutions. The alkali metal hydroxides are preferably used in the form of 5M to 9M solutions and the alkaline earth metal hydroxides in the form of 3M to 4M solutions.

During addition, the pH must be between 9 and 12. When the carbyl sulfate is added to an alkali metal solution the pH is preferably between 9 and 11, and when it is added to an alkaline earth metal solution the pH is preferably between 10 and 11. Temperatures are kept between 30° and 50°C during the period of addition. In the case of alkali metal hydroxides the temperature is preferably between 35° and 40°C, whilst it is preferably kept between 30° and 35°C when alkaline earth metal hydroxides are used.

The subsequent heating to 70°–150°C is necessary to ensure complete conversion to vinyl sulfonate. When the reaction proceeds in the presence of alkaline earth metal salts, subsequent heating is preferably carried out at from 100° to 150°C, whilst in the case of alkali metal hydroxides heating to preferably 70°–80°C is sufficient.

Precipitation of the vinylsulfonates is conveniently effected by cooling the reaction solution to from 0° to 3°C in the case of alkali metal vinyl sulfonates, and it is sufficient to cool to only 70°–90°C in the case of alkaline earth metal vinyl sulfonates, as these are much less soluble.

The process of the invention may be carried out in a number of ways.

Where caustic soda is used, the reaction may be carried out, for example, in a circular tube system, i.e., a cooled closed loop. The basic solution is circulated, generally in the form of a 20–28% aqueous caustic soda solution, to which a predetermined amount of carbyl sulfate is added until a pH of 10 is reached. pH measurements are generally carried out with a pH electrode. Further 20–28% caustic soda solution is continuously added to the circulated mixture, during which operation the pH must not exceed the above value and the temperature must be maintained at, for example, from 32° to 35°C. The overflowing liquid is collected in a tank which is heated to, say, 70°C and maintained at a pH of 11, to which end further 20–28% caustic soda solution is added if necessary.

After a residence time of from 10 to 60 minutes and preferably of about 30 minutes the reaction solution is cooled to from 0° to 3°C while the pH is simultaneously reduced to an average value of 9 with an acid, for example sulfuric acid. Separation of the sodium vinyl sulfonate solution from the sodium sulfate formed as a by-product is conveniently carried out in, say, a centrifuge.

When calcium hydroxide is used as the reaction medium for the saponification of carbyl sulfate, it is convenient to charge the carbyl sulfate in solid form to a stirred vessel, in which the equivalent amount of calcium hydroxide in water has already been placed. The concentration of the calcium hydroxide is from 1 to 10 mole/l and preferably from 2 to 6 mole/l The neutralization temperature is maintained at about 32°C by external cooling. The pH should be from 10 to 11. The vessel is then heated to from 100° to 150°C and preferably from 140° to 150°C under autogenous pressure. The contents of the vessel are finally cooled to about 80°C to enable the precipitated calcium sulfate to be filtered from the vinyl sulfonate solution.

To prepare free vinylsulfonic acid, it is convenient to take the calcium vinyl sulfonate solution and acidify this in a separate vessel at from 0° to 8°C with, say, concentrated sulfuric acid. After a time, the calcium precipitates in the form of calcium sulfate. The mixture is filtered to give a colorless vinylsulfonic acid.

The thus prepared vinylsulfonic acid and salts thereof are valuable starting materials for copolymerization with other copolymers, for example ethyl acrylate, methyl acrylate and acrylonitrile, and they are also valuable for the manufacture of copolymers. They are useful stabilizers for polymer dispersions, brighteners for use in the electroplating of plastics materials and they are intermediates in the preparation of products such as taurine or N-methyl taurine prepared by reaction with ammonia or amines.

In the following Examples, the parts are by weight unless otherwise stated. The parts by volume relate to the parts by weight as do kilograms to liters.

EXAMPLE 1

The reaction is carried out in a circular tube system comprising a cooler and buffering vessel equipped with a high-speed stirrer. A neutralization temperature of about 33°C is maintained by cooling with water. The solution is circulated at a rate of 12,000 parts by volume per hour by means of a centrifugal pump. The process is started by circulating a 25% aqueous solution of sodium hydroxide, to which 137.1 parts per hour of carbyl sulfate are added, the carbyl sulfate having been obtained in known manner by reacting 22.05 parts of ethylene with 119.8 parts of gaseous sulfur trioxide and 2.0 m³ (STP) of dry air. When the pH reaches 10, as measured by pH electrode, a controlled, continuous stream of 25% sodium hydroxide solution is added to the system, the pH being maintained between 10 and 12 and the neutralizing temperature between 32° and 35°C. The material overflowing from the buffering vessel is collected in an intermediate tank maintained at 70°C and pH 11, further 25% caustic soda being added if necessary. The total consumption of 25% NaOH solution is 368 parts/hr. After a residence time of 30 minutes, the reaction solution is cooled by a scraper crystallizer to from 0° to −3°C while the pH is reduced to 9 by the addition of dilute sulfuric acid. The sodium vinyl sulfonate solution is then separated from the precipitated sodium sulfate by centrifuging and the residue is elutriated with a little cold water.

There are obtained 292 parts/hr of vinyl sulfonate solution having the following characteristics:

solids content: 33.5%
iodine number (hydrogenation): 56.7 (= 29% of sodium vinylsulfonate)
$Na_2SO_4$ content: 1.5%
sodium isethionate content: 3.0%
color number (Klett): 21

EXAMPLE 2

100 parts of flaked carbyl sulfate are charged to a stirred vessel in which 59 parts of calcium hydroxide and 200 parts of water have already been placed. The neutralization temperature is maintained at from 30° to 32°C by external cooling and the pH must be between 10 and 11. The vessel is then closed and heated for 10 minutes at 150°C, whereupon the contents of the vessel are cooled to about 80°C and filtered from the precipitated calcium sulfate.

There are obtained 244 parts of clear and virtually colorless calcium vinyl sulfonate solution giving the following analysis results:

solids content: 25.5%
iodine number (hydrogenation): 47 (= 23.5% of calcium vinyl sulfonate)
calcium sulfate content: less than 0.1%.

To obtain the free vinylsulfonic acid, 100 parts of calcium vinyl sulfonate solution having a solids content of 52% are carefully acidified in a stirred vessel at from 0° to 8°C with 20.4 parts of 98% sulfuric acid. The mixture is stirred for about 1 hour and the precipitated calcium sulfate is then filtered off. There are obtained 105 parts of a colorless vinylsulfonic acid of the following composition:

water content: 60%
iodine number (hydrogenation): 89 (= 40% of vinylsulfonic acid)
calcium sulfate content: less than 0.1%.

We claim:

1. In a process for the manufacture of a vinyl sulfonate by treating carbyl sulfate under alkaline conditions, the improvement comprises carrying out the process in two stages wherein
    a. said first stage is carried out by circulating a 20 to 28% aqueous caustic soda solution in a cooled closed loop, adding carbyl sulfate to the circulating solution until the pH reaches a value of 10 and then adding to the circulating solution on a continuous basis carbyl sulfate and sufficient 20 to 28% aqueous caustic soda solution such that the pH value is maintained between 10 and 12, the reaction solution being subjected to stirring and maintained at a temperature between 30° and 50°C, while continuously passing overflowing reaction solution into a separate reaction zone; and
    b. said second stage is carried out by heating the reaction solution in said separate reaction zone to a temperature of from 70° to 150°C for a period of from 10 to 60 minutes and then cooling the solution for terminating the reaction.

2. A process as claimed in claim 1 wherein the pH in said first stage is continuously maintained within a range of 10 to 11.

3. A process as claimed in claim 1 wherein the temperature in said first stage is maintained between 32° and 35°C.

* * * * *